United States Patent [19]

Welschof et al.

[11] 4,392,838

[45] Jul. 12, 1983

[54] SEALING BOOT FOR UNIVERSAL JOINT

[75] Inventors: Hans-Heinrich Welschof, Rodenbach; Karl Damian, Rodgau, both of Fed. Rep. of Germany

[73] Assignee: Löhr & Bromkamp GmbH, Offenbach am Main, Fed. Rep. of Germany

[21] Appl. No.: 238,444

[22] Filed: Feb. 26, 1981

[30] Foreign Application Priority Data

Mar. 13, 1980 [DE] Fed. Rep. of Germany ....... 3009639

[51] Int. Cl.³ .............................................. F16D 3/84
[52] U.S. Cl. ..................................................... 464/175
[58] Field of Search ................................ 464/173–175

[56] References Cited

U.S. PATENT DOCUMENTS

| | | | |
|---|---|---|---|
| 3,822,570 | 7/1974 | Fisher | 464/173 X |
| 3,858,412 | 1/1975 | Fisher et al. | 464/175 X |
| 4,202,184 | 5/1980 | Krude et al. | 464/175 X |
| 4,210,002 | 7/1980 | Dore | 464/175 |
| 4,224,808 | 9/1980 | Gehrke | 464/175 |
| 4,249,395 | 2/1981 | Krude et al. | 464/175 X |

FOREIGN PATENT DOCUMENTS 2900026  8/1979  Fed. Rep. of Germany .

*Primary Examiner*—John Petrakes
*Attorney, Agent, or Firm*—Toren, McGeady and Stanger

[57] ABSTRACT

A sealing boot for a universal joint including a pair of terminal portions each engaged with different parts of the joint to provide a protective seal therefor. One of the terminal portions is structured as a non-return valve to permit fluid flow from the interior of the sealing boot to alleviate excess pressure. The non-return valve is formed by an annular collar having channels defined therein with a resilient sleeve extending exteriorly of the sealing boot to be lifted from engagement with a part of the universal joint when pressure within the channel exceeds a specified limit. A resilient sleeve extending interiorly of the sealing boot may also be provided so that atmospheric air may be permitted to enter the boot for pressure equalization.

8 Claims, 6 Drawing Figures

SEALING BOOT FOR UNIVERSAL JOINT

This invention relates to a sealing boot for retaining lubricant in, and excluding dirt from, a universal joint, the boot including first and second collars for attachment to respective parts of or associated with the universal joint. Usually the parts to which the collars are attached will be the outer member of a constant velocity universal joint or a member secured thereto, and a shaft fitted to the inner member of the joint.

It has been proposed, e.g., in German Offenlegungschrift No. 29 00 026, that the sealing boot of a universal joint should provide a permanently open channel between the interior of the boot and the external atmosphere. This prevents the internal pressurization or formation of a partial vacuum within the boot as a result of heating and cooling. However, there is a risk that water and dirt may penetrate through the channel into the interior of the boot and joint, which risk is particularly severe for off-highway vehicles.

It is an object of the present invention to provide a sealing boot which is capable of reducing internal pressure variations but which also reduces the risk of water or dirt penetration.

SUMMARY OF THE INVENTION

Briefly, the present invention may be described as a construction for a sealing boot for a universal joint which includes a pair of terminal portions each engaged, respectively, with different parts of the universal joint to provide a protective seal for the joint. The specific improvement of the invention comprises that at least one of the terminal portions of the sealing boot is formed with an annular collar arranged in sealed engagement with one of the different respective parts of the joint and with channel means defined between the collar and said one joint part for enabling fluid flow therethrough between the interior and the exterior of the joint portion sealed by the sealing boot. Resilient means located on one side of the channel means in releasable sealing engagement with said one joint part are adapted to be resiliently released from engagement with the joint part by fluid pressure within the channel means to enable fluid to flow from the channel means. The resilient means thereby essentially comprise a nonreturn valve whereby fluid flow may exit from the channel means but no fluid may enter the channel means from the side of the collar on which the resilient means are provided.

Of course, the resilient means may be provided on a side of the channel means interiorly of the joint portion sealed by the sealing boot or on the exterior thereof. Additionally, the resilient means may be provided on both sides whereby a buildup of fluid pressure inside of the sealing boot may be released and whereby when the fluid pressure inside of the sealing boot is below ambient atmospheric pressure, fluid flow to the interior of the boot may avoid collapsing of the boot.

Thus, if there arises a tendency for the internal pressure of the boot to increase due to a temperature increase, the resilient means, which may be in the form of an elastic sleeve, will permit venting of air from the boot interior but will act as a nonreturn valve to present ingress of dirt or water. This is a satisfactory arrangement if the sealing boot is of the rolling bellows type, which tends to maintain its shape if its internal pressure is less than ambient pressure.

In an embodiment whereby the resilient means are formed to extend to the interior of the boot thereby enabling fluid flow into the boot from the external atmosphere, the advantage of such an arrangement is that if cooling of the universal joint results in a lowering of the pressure within the boot below external atmospheric pressure, the resilient means or sleeve will act as a valve to permit air to enter the boot and prevent possible collapse of the boot. If the boot is of the folded or convoluted bellows type, there would be a risk that the folds would rub against each other and ultimately fall if the boot collapsed.

If the boot is capable of withstanding a certain amount of internal pressurization or partial vacuum, the resilient means may be adapted to permit passage of air to or from the interior of the boot only when a predetermined difference in pressure exists between the interior and the exterior thereof. This further reduces the possibility of dirt entering the boot.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
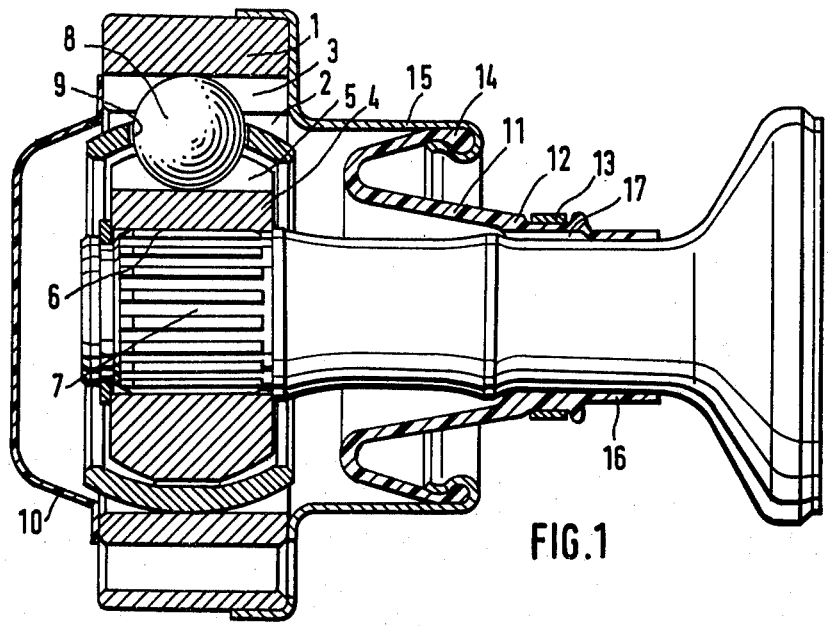
FIG. 1 is a sectional view of a universal joint assembly having one embodiment of a sealing boot in accordance with the present invention.

Referring first to FIG. 1, there is illustrated a universal joint comprising an outer member 1 having an inner wall defining a cavity 2 in which axially extending circumferentially spaced grooves 3 are provided. An inner joint member 4 is disposed within the outer member 1, and has axially extending grooves 5 facing the grooves 3 of the outer joint member. A number of balls 8 are provided one in each pair of grooves in the outer and inner joint members, for transmitting torque between these members. Each ball is held in a window in an annular cage 9 disposed between the inner and outer joint members. The inner joint member 4 has a splined bore 6 in which the splined end of a drive shaft 7 is received.

The universal joint is closed on one side by a rigid cap 10 fixed to the joint outer member. The joint could also be used on this side by an appropriate part of a vehicle hub assembly. On the opposite side, a sealing boot 11 is connected between the joint outer member and drive shaft, the sealing boot being of rolling bellows type and having a first collar 12 which is secured to the drive shaft 7 by a clamping ring 13, and a second collar or bead 14 held by a sleeve 15 in which in turn is fixed to the outer joint member.

The boot 11 has, integral with collar 12, an axially extending sleeve 16, which is elastically deformable, the boot itself being made of an appropriate flexible elastic material such as rubber. The sleeve 16 embraces the drive shaft, and is in communication with the interior of the boot by way of a passage 17 defined by a groove in the interior surface of the collar 12. If pressure within the boot exceeds external atmospheric pressure, the sleeve 16 lifts from the drive shaft to relieve the excess pressure.

Figure 2:
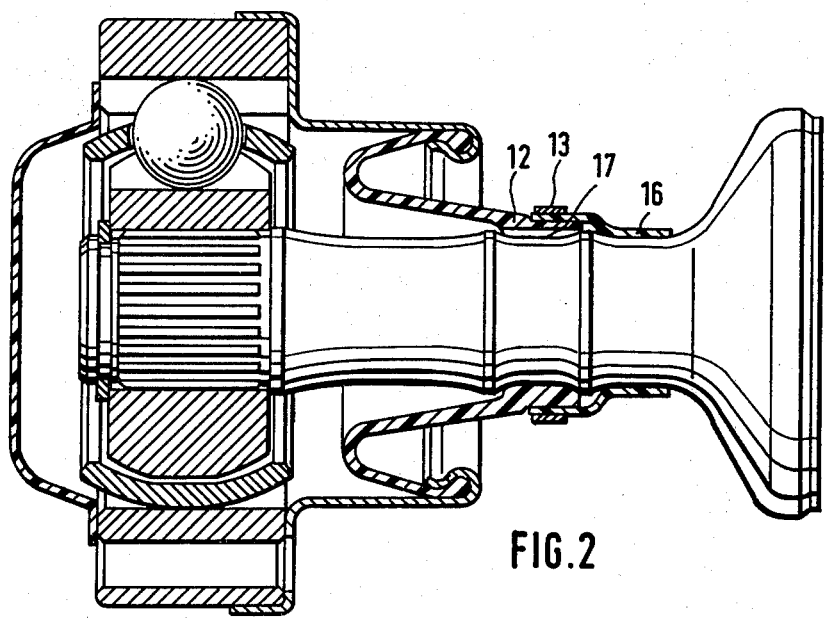
FIG. 2 is a cross-sectional view showing a modification of the embodiment depicted in FIG. 1.

In FIG. 2, there is shown a sleeve 16 which is a component separate from the boot itself. The sleeve is secured to the outer surface of collar 12 by the clamping ring 13, and a passage 17 is defined by a groove in the interior surface of the collar to permit venting of air when the sleeve 16 lifts from the drive shaft.

Figure 3:
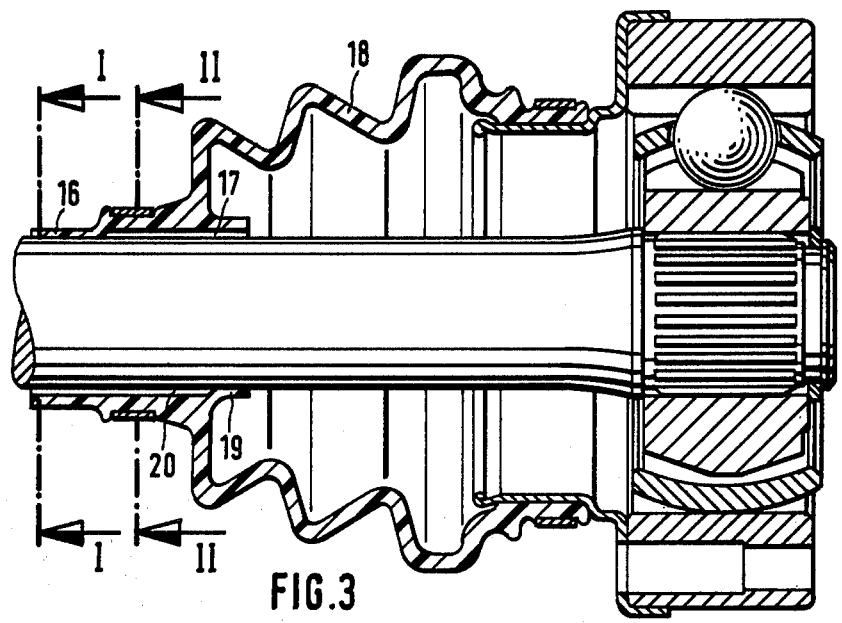
FIG. 3 is a sectional view of a universal joint assembly having another embodiment of a sealing boot in accordance with the present invention.

FIG. 3 shows a universal joint which in principle is the same as that of FIG. 1. In this case, however, the sealing boot 18 is of convoluted or folded bellows type. With this sort of boot, if a pressure below external atmospheric pressure is established within the boot, there is a danger that the folds would collaspe inwardly and rub against each other causing the boot to fail. In this embodiment, therefore, the collar of the sealing boot which is attached to the drive shaft has, in addition to an outwardly extending sleeve 16 and passage 17 for relief of excess pressure from the interior of the boot, an inwardly extending sleeve 19 and associated passage 20 leading to the external atmosphere. This permits flow of air into the interior of the boot if the internal pressure drops below ambient, in the same manner as venting of air from the boot is permitted.

Figure 4:
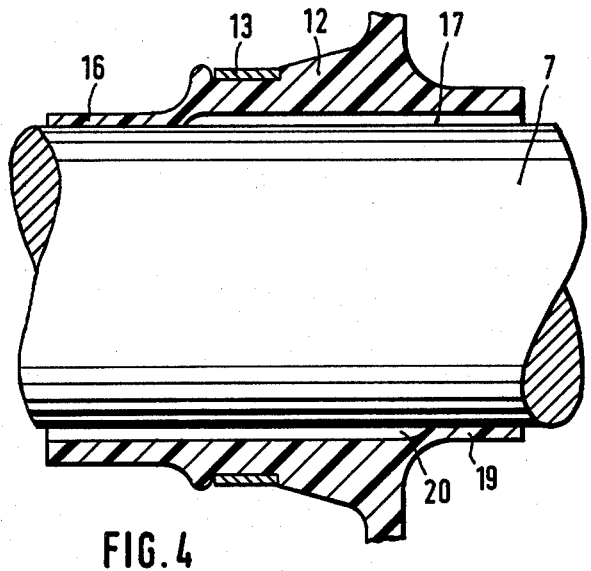
FIG. 4 is a sectional view showing an enlargement of a part of FIG. 3.

The construction of collar 12, its clamping ring 13, and the outwardly and inwardly extending sleeves 16, 19 and their associated passages 17, 20, is shown in FIG. 4. Non-return or check valve means are provided for the invention by the construction including either or both of the sleeves 16, 19, since the sleeve 16 acts as a non-return valve to provide for the outflow of air, and sleeve 19 as a non-return valve for the inflow of air.

Figure 5:
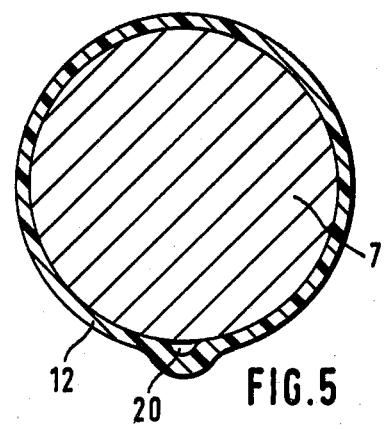
FIG. 5 is a section taken along the line I—I of FIG. 3.
Figure 6:
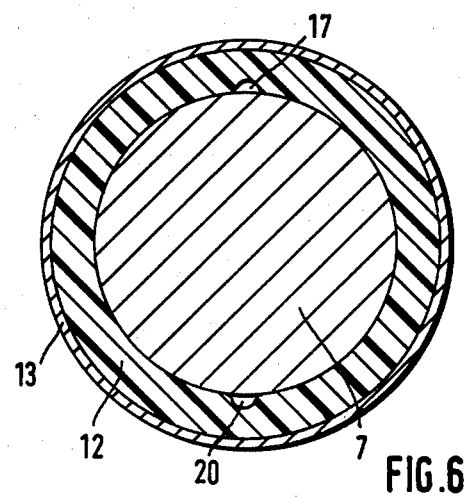
FIG. 6 is a section taken along the line II—II of FIG. 3.

FIG. 5 shows in section the groove which defines the passage 20, and FIG. 6 additionally shows the groove defining the passage 17.

If the sealing boot can withstand a certain pressure above or below ambient pressure without damage, the non-return valve means may be arranged to operate only when such acceptable pressure differential is exceeded. This further reduces the likelihood of dirt entering the boot.

While specific embodiments of the invention have been shown and described in detail to illustrate the application of the inventive principles, it will be understood that the invention may be embodied otherwise without departing from such principles.

What is claimed is:

1. In a sealing boot for a universal joint including a pair of terminal portions each engaged, respectively, with different parts of said universal joint to provide a protective seal for said joint, the improvement wherein at least one of said terminal portions comprises annular collar means arranged in sealed engagement with one of said different respective parts of said joint, channel means defined between said collar means and said one joint part for enabling fluid flow therethrough between the interior and exterior or joint portions sealed by said sealing boot and resilient check valve means located on one side of said channel means, said resilient check valve means being normally in sealing engagement with said one joint part to prevent fluid flow through said channel means with the level of fluid pressure within said channel means operating to resiliently release said resilient check valve means from said sealing engagement to enable fluid flow through said channel means.

2. A sealing boot according to claim 1 wherein said resilient check valve means extends on a side of said channel means toward the interior of the joint portions sealed by said sealing boot.

3. A sealing boot according to claim 1 wherein said resilient check valve means extends on a side of said channel means to the exterior of joint portions sealed by said sealing boot.

4. A sealing boot according to claim 1 wherein said channel means comprise a plurality of distinct channels with at least one of said channels having said resilient check valve means extending therefrom on a side toward the interior of said joint portions sealed by said sealing boot and wherein at least another one of said channels has said sealing means extending on a side thereof toward the exterior of joint portions sealed by said sealing boot.

5. A sealing boot according to claim 1 wherein said channel means comprise channels formed in said collar means and wherein said resilient means comprise a resilient sleeve formed integrally with said collar means.

6. A sealing boot according to claim 1 wherein said resilient means comprise a component separate from said collar means.

7. A sealing boot according to claim 1 wherein said resilient means is structured to permit fluid flow from said channel means only when a predetermined pressure difference exists between the interior of said sealing boot and the exterior thereof.

8. In a sealing boot for a universal joint including a pair of terminal portions each engaged respectively with different parts of said universal joint to provide a protective seal for said joint, the improvement wherein at least one of said terminal portions is structured to comprise non-return valve means permitting fluid flow between the interior of said sealing boot and the exterior thereof in order to maintain the fluid pressure level on the interior of said sealing boot within predetermined limits.

* * * * *